United States Patent Office 3,847,937
Patented Nov. 12, 1974

3,847,937
PROCESS FOR THE PREPARATION OF INDOLES
Pietro Moggi and Ugo Romano, Milan, Italy, assignors to Snam Progetti S.p.A., Milan, Italy
No Drawing. Filed May 12, 1972, Ser. No. 252,885
Claims priority, application Italy, May 13, 1971, 24,466/71
Int. Cl. C07d 27/56
U.S. Cl. 260—319.1           8 Claims

ABSTRACT OF THE DISCLOSURE

A process for preparing nitrogenous heterocyclic compounds of the indole or quinoline type by pyrolyzing dephenylaminoalkanes.

The present invention relates to a process for preparing nitrogeneous heterocyclic compounds, belonging to indole or quinoline group, by means of pyrolysis of compounds having the formula

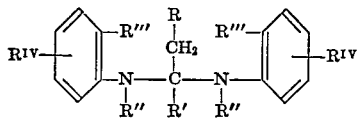

wherein R, R', R" and R''' may be hydrogen or an alkyl radical; $R^{IV}$ may be hydrogen, an alkyl or an aryl radical, or a nitro, halogen, cyano, amino, alkoxy group. Syntheses of heterocyclic compounds are known, but generally basing on methods which require expensive starting materials and/or catalysts, and on difficult processes which give rise to low yields of the final product.

An advantageous method for preparing nitrogeneous heterocyclic compounds belonging to indole or quinoline group has now been found; it can be industrially applied and bases on a simple and cheap process.

The inventive reaction bases on a pyrolysis of compounds easily available by methods well known from the art, for instance by a reaction at low temperature between an aromatic amine and an aliphatic aldehyde, or by a reaction between the sodium derivative of the aromatic amine and an aliphatic hydrocarbon containing two halogen atoms on the same carbon atom.

According to the present process the reaction develops up to the formation of the heterocyclic compounds, whilst a portion of the starting aromatic amine is recovered, which can be recycled to the synthesis of the compound which will be subjected to pyrolysis.

Representative examples of the inventive reaction are the preparation of indole from 1,1'-diphenylamine ethane, quinoline from 1,1'-diphenylaminopropane or 1,1'-di (o-methyl) phenyl-aminoethane, 2-methylindole from 2,2'-diphenylaminopropane, 5-methylindole from 1,1'-di (p-methyl) phenylaminoethane, 2-methyl-quinoline from 2,2'-diphenylamino-n-butane and the like.

The reaction is carried out at temperatures ranging from 300° to 800° C., preferably from 500° to 700° C., without catalysts or by employing suitable catalysts as, for instance, silica, alumina, silica-alumina, silica-aluminates, oxides or mixtures of oxides of metals belonging to the 3rd, 4th, 5th, 6th and 8th group of the periodic system.

A peculiar advantageous use is made of silica.

The reaction pressure may widely range, i.e. from few mm. Hg to 10 atmospheres; however it is preferable the reaction is carried out at the atmospheric pressure.

The reaction is carried out without oxygen or any oxidative agent.

However use may be made of air or of any gas, if being weak oxidative agent, when one wishes the reaction temperature be decreased: The molar ratio between air or the weak oxidative gas and the organic compound to be has not higher than 20:1 in order to avoid the combustion of the reactant.

The organic compound which is to be subjected to the pyrolysis reaction is fed in the gaseous state, preferably mixed with diluent inert to same as steam, carbon dioxide, carbon monoxide, nitrogen, argon or hydrocarbon steady at the reaction conditions.

The contact times at which the reaction is carried out range from 0.01 to 20 seconds, preferably from 0.1 to 10 seconds: as contact time we mean the ratio between the volume of the reactor wherein the reaction runs and the total feeding flow at the gaseous state in the reaction conditions.

The preparation of indole from 1,1' - diphenylamino ethane will now pointed out as an unrestrictive example of the reaction according to the present invention.

EXAMPLE 1

Use was made of a stainless steel reactor having an 1½" internal diameter; 1,1'-diphenylaminoethane was fed into it mixed with toluene, as a diluent, in a molar ratio of 1:18.

The temperature was 580° C. and the contact time was 2.5 sec.

A 100% conversion of 1,1'-diphenylaminoethane was obtained at a selectivity to indole of 5% and to aniline of 80%.

EXAMPLE 2

In the same reactor of Example 1 were introduced 526 g. of silica, prepared by atomization and extrusion from a sol of colloidal silica at 30% by weight of $SiO_2$, stabilized by 0.25% by weight of $NH_3$ (Silica "Ludex" A.S.).

The so obtained catalytic bed was 0.5 m. long. 1,1'-diphenylaminoethane was fed at 630° C. mixed with toluene, at a molar ratio of 1:20, and a contact time of 4 seconds.

The analysis of the effluent from the reactor showed a total conversion of the starting product at a selectivity of 23% to indole and 100% to aniline.

In the reported examples the conversion and selectivity terms have the following meanings:

Conversion $$= \frac{\text{reacted moles of 1,1'-diphenylaminoethane}}{\text{fed moles of 1,1'-diphenylaminoethane}} \cdot 100$$

Selectivity to indole $$= \frac{\text{produced moles of indole}}{\text{reacted moles of 1,1'-diphenylaminoethane}} \cdot 100$$

Selectivity to aniline $$= \frac{\text{recovered moles of aniline}}{\text{reacted moles of 1,1'-diphenylaminoethane}} \cdot 100$$

What we claim is:

1. A process for preparing indole by pyrolysis, comprising subjecting 1,1'-diphenylaminoethane to a temperature of about 500° C. to about 700° C. for a time from about 2 to about 5 seconds.

2. The process according to claim 1 wherein the 1,1'-diphenylaminoethane is subjected to said temperature in the presence of a silica catalyst.

3. The process according to claim 2 wherein said silica catalyst is prepared from a sol of colloidal silica at 30% by weight of $SiO_2$, stabilized by 0.25% by weight of $NH_3$.

4. The process according to claim 1 wherein said 1,1'-diphenylaminoethane is admixed with an inert diluent before being subjected to said temperature.

5. The process according to claim 4 wherein said inert diluent is toluene.

6. The process according to claim 5 wherein the molar ratio between 1,1'-diphenylaminoethane and toluene is from about 1:18 to 1:20.

7. The process according to claim 1 wherein said temperature is about 580° C. and the time said 1,1'-diphenylaminoethane is subjected to said temperature is about 2.5 seconds.

8. The process according to claim 2 wherein the temperature is about 630° C. and the time said 1,1'-diphenylaminoethane is subjected to said temperature is about 4 seconds.

References Cited
UNITED STATES PATENTS 2,953,575   9/1960   Erner et al. _____ 260—319.1

JOSEPH A. NARCAVAGE, Primary Examiner

U.S. Cl. X.R.

260—283